United States Patent [19]

Kirk et al.

[11] 3,933,640

[45] Jan. 20, 1976

[54] METHODS AND APPARATUS FOR TREATING WASTEWATER

[75] Inventors: Bradley S. Kirk, North Plainfield; Raymond M. Chappel, Mendham, both of N.J.

[73] Assignee: Airco, Inc., Montvale, N.J.

[22] Filed: Sept. 20, 1974

[21] Appl. No.: 507,847

Related U.S. Application Data

[63] Continuation-in-part of Ser. No. 413,409, Nov. 6, 1973.

[52] U.S. Cl. .............. 210/197; 210/219; 210/220; 210/256; 210/320; 261/91
[51] Int. Cl.[2] .................... C02C 1/02; C02B 3/08
[58] Field of Search .................. 55/192; 209/170 210/4–8, 14, 15, 63, 170, 195, 197, 199, 218, 220, 221, 320, 242, 219, 256; 261/119 R, 91, DIG. 75

[56] References Cited
UNITED STATES PATENTS

| | | | |
|---|---|---|---|
| 1,732,893 | 10/1929 | Hunt | 209/170 |
| 2,638,444 | 5/1953 | Kappe | 210/14 X |
| 3,133,017 | 5/1964 | Lambeth | 210/5 |
| 3,220,706 | 11/1965 | Valdespino | 210/14 X |
| 3,503,593 | 3/1970 | Nelson | 261/91 X |
| 3,547,811 | 12/1970 | McWhirter | 210/7 |
| 3,643,403 | 2/1972 | Speece | 261/91 X |
| 3,713,274 | 1/1973 | Sauer et al. | 55/192 X |
| 3,725,258 | 4/1973 | Spector et al. | 20/7 |
| 3,775,307 | 11/1973 | McWhirter et al. | 210/14 |
| 3,794,303 | 2/1974 | Hirshon | 261/91 X |

*Primary Examiner*—Charles N. Hart
*Assistant Examiner*—Robert H. Spitzer
*Attorney, Agent, or Firm*—David L. Rae; H. Hume Mathews; Edmund W. Bopp

[57] ABSTRACT

Methods and apparatus for treating wastewater, such as municipal sewage, are provided in which an oxygen enriched feed gas is supplied to an oxygenation chamber wherein oxygen is efficiently dissolved in wastewater (mixed liquor) by means of a static mixing device. The chamber is preferably submerged in a large body of wastewater being treated, such as is commonly found in the secondary stage of an activated sludge wastewater treatment system with the chamber being adapted to receive such wastewater from a location slightly below the surface thereof. Oxygenated wastewater is discharged from the chamber in either a radial or multi-directional pattern at a sufficient velocity to effect a thorough mixing of the oxygenated wastewater and the large body of wastewater contained in the secondary stage treatment tank. The overall concentration of dissolved oxygen in the wastewater is maintained throughout the tank to a level sufficient to sustain microbial digestion of organic waste while providing the requisite stirring necessary to preclude settling of solids from the wastewater.

13 Claims, 6 Drawing Figures

METHODS AND APPARATUS FOR TREATING WASTEWATER

This application is a continuation-in-part of application Ser. No. 413,409, filed Nov. 6, 1973, and which is assigned to the assignee of the present invention.

BACKGROUND OF THE INVENTION

The present invention relates to methods and apparatus for treating a waste liquid with a gas and more particularly to methods and apparatus for oxygenating wastewater as, for example, in an activated sludge secondary stage waste treatment process.

In order to avoid intolerable ecological and environmental damage, efforts have continually been made to provide wastewater treatment plants of sufficient capacity to adequately treat or purify increasing quantities of municipal sewage and industrial wastes. One well known technique for purifying wastewater is the activated sludge process. In this process, aerobic microbial activity is relied upon to cause a digestion or consumption of organic waste materials. In order to sustain such microbial action, oxygen must be dissolved into the wastewater (which preferably comprises a mixed liquor of liquid waste and microbial solids) at rates proportional to the microbial activity. The rate of oxygen dissolution required generally varies in accordance with the biological oxygen demand (BOD) of the particular wastewater being treated and the microbial population. A number of techniques are currently used or proposed for obtaining the required dissolution rates.

Briefly, prior art techniques for oxygenating wastewater include an air aeration process wherein ambient air is relied upon as an oxygen source and by vigorously agitating the wastewater, such as by means of a surface impeller, a transfer of oxygen into the wastewater is achieved. However, as the oxygen content of air is only 21 percent, this dissolution technique requires substantial wastewater 'retention' time and relatively high expenditures of electrical power in driving such mechanical mixing devices. In other prior art techniques, oxygen enriched air has been proposed as a means of reducing the aforementioned retention time and in this regard, systems for diffusing minute bubbles of oxygen into wastewater have been suggested. Although capital costs of such systems are relatively low, it has been found that the amount of oxygen which is not dissolved in the wastewater, and hence is released to the atmosphere is many times of an economically unacceptable level. This wastage of oxygen is particularly noticeable in relatively shallow secondary treatment tanks. Other techniques for oxygenating wastewater include downflow bubble contact devices wherein an oxygen enriched gas is injected into a rapidly descending current of wastewater. The momentum interchange between such fluids tends to reduce the rise velocity of the gas bubbles, thereby increasing the period of time during which oxygen and wastewater are maintained in contact and thus enabling a transfer of oxygen into the wastewater. This technique, as for example described in U.S. Pat. Nos. 3,476,366 and 3,643,403, has the disadvantage that substantially complete dissolution of oxygen into the wastewater cannot be assured and that any oxygen not so dissolved is generally lost to the atmosphere.

Still further prior art attempts to efficiently oxygenate wastewater include the concept of covering a secondary stage treatment tank and providing an oxygen enriched atmosphere in the ullage space so formed above the wastewater therein. Such a technique is described in an article entitled "Aeration With a High-Oxygen Atmosphere in A. S. Process," by Harold E. Babbitt, *Wastes Engineering*, May, 1952, pages 258–259. In this system a feed gas of approximately 95 percent oxygen was bubbled through wastewater to be treated with undissolved oxygen being collected in the ullage space, recompressed and recirculated as a feed gas to the closed aeration tank. Similar techniques wherein oxygen is bubbled through wastewater and/or mixed with the wastewater by means of a submerged turbine or surface impeller are described in U.S. Pat. Nos. 3,547,811–3,547,815. It is recognized, however, that both the Babbitt system and the latter techniques require confining a relatively large volume of an oxygen-enriched aeration gas in the ullage space beneath a tank cover and as such, provide a substantial supply of a combustion supporting medium. As rotating mechanical mixing equipment as described in the foregoing patents provides a potential source of sparks and combustible material exists in the form of lubricants, potentially dangerous fire hazards are presented.

As each of the foregoing prior art techniques for treating wastewater possesses certain undesirable characteristics it is clear that a present need exists for improved methods and apparatus for dissolution of oxygen in wastewater by an efficient mass transfer action as well as safely effecting a reduction of the power requirements necessary for such mass transfer and tank mixing.

OBJECTS

It is an object of the present invention to provide methods and apparatus for efficiently oxygenating wastewater, such as municipal sewage or industrial wastes in concert with a suitable microbial population.

It is also an object of the present invention to provide methods and apparatus for oxygenating wastewater under treatment without reliance upon the mechanical mixing of an oxygen containing feed gas and wastewater or mechanically stirring the solid-liquid contents of a treatment tank.

It is still another object of the present invention to provide methods and apparatus for treating wastewater wherein an oxygenating chamber is emplaced in a larger treatment tank, which chamber is effective to discharge oxygenated wastewater therefrom so as to thoroughly mix the oxygenated wastewater with wastewater confined in the treatment tank.

It is yet another object of the present invention to provide methods and apparatus for discharging oxygenated wastewater from the bottom portion of an oxygenating chamber in a substantially radial pattern so as to enable a thorough mixing of the liquid in a treatment tank throughout virtually all portions thereof.

It is a further object of the present invention to provide methods and apparatus for treating wastewater in an activated sludge waste treatment process wherein oxygenated wastewater is discharged from an oxygenating chamber into the lower reaches of a larger treatment tank to provide a thorough mixing of the oxygenated wastewater and wastewater in the treatment tank while sufficiently stirring the combined tank contents

3 to maintain solids in suspension as required to promote effective microbial digestion of organic waste material.

It is yet another object of the present invention to provide methods and apparatus for dscharging oxygenated wastewater through one or more, or all sides of an oxygenating chamber into the lower reaches of a larger wastewater treatment tank to assure a thorough mixing of the oxygenated wastewater with the contents of the treatment tank.

It is still a further object of the present invention to provide methods and apparatus for admitting wastewater to be oxygenated into an oxygenating chamber wherein the frictional losses of a flow of wastewater so introduced are minimized thereby improving the utilization efficiency of supplied hydraulic energy necessary to produce a static gas-liquid mixing of oxygen and wastewater in the chamber.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, methods and apparatus for dissolving a gas such as oxygen in a liquid such as wastewater comprise providing an oxygenating chamber in a relatively large body of the liquid being treated with the chamber having an inlet for receiving the liquid, a static mixing means for dissolving the gas, such as oxygen, in the liquid and discharge means for discharging oxygenated liquid into said larger body of liquid in a radial or multi-directional pattern such that the oxygenated liquid is thoroughly mixed with the larger body of liquid.

Preferably, static mixing means are provided within an oxygenating chamber comprised of one or more gravitational fall zones wherein oxygenation of wastewater may be accomplished by passing wastewater over a weir or baffle at a preferred superficial flow velocity thereby generating a forced free fall of wastewater through an oxygen enriched aeration gas. The falling wastewater impinges upon wastewater in the lower reaches of the gravitational fall zone thereby creating a high degree of gas-liquid turbulence which is effective to promote a mass transfer of a gas such as oxygen into a liquid such as wastewater. The wastewater then passes from the fall zone to a relatively quiescent liquid accumulation space from which entrained oxygen is disentrained into the gas accumulation space for return to the fall zone thereby enabling further exposure to the influent liquid stream to oxygen in the gas accumulation space. The gas accumulation space is maintained in the chamber above the liquid accumulation space by introducing an oxygen-enriched feed gas under a predetermined pressure which is effective to depress the liquid level within the chamber to an extent corresponding to such pressure and thereby define a 'fall height' between such liquid level and the weir or partition over which the influent wastewater is forced to flow. Preferably, the oxygenation chamber so described is provided with a plurality of symmetrically configured gravitational fall zones and gas accumulation spaces such that an overall balance of buoyance forces on the chamber is maintained. In addition, it is preferred to fully submerge the chamber and to admit wastewater to be oxygenated through an inlet conduit disposed in the top wall of the chamber at a point slightly below the surface of the liquid in the treatment tank.

Wastewater in the liquid accumulation space is maintained under a pressure head corresponding to the pressure of the feed gas introduced into the oxygenating chamber. Accordingly, such a pressure head provides the motive force for discharging oxygenating wastewater from the chamber through a suitable outlet or nozzle discharge. In order to assure that oxygenated wastewater discharged from the chamber is thoroughly mixed with wastewater confined in the treatment tank, it is preferred to provide a nozzle at the chamber outlet which is effective to establish a radial or multi-directional flow of oxygenated wastewater at velocities sufficient to adequately mix the contents of the treatment tank. In addition, by discharging oxygenated wastewater from the lower portion of the chamber, the greatest degree of mixing in the treatment tank is achieved where such mixing is most urgently required, i.e., at the lower reaches of bottom thereof. Thus, by providing an adjustable nozzle which establishes a radial or multi-directional flow pattern of oxygenated wastewater at selected velocities in the lower reaches of the larger treatment tank, a thorough mixing of the oxygenated wastewater and treatment tank contents is achieved thereby increasing the average dissolved oxygen level of wastewater in the treatment tank to magnitude sufficient to sustain microbial activity in an activated sludge process. In addition, the aforementioned mixing in the lower reaches of the treatment tank is also effective in satisfying a second requisite of the activated sludge process, namely the provision of sufficient tank stirring to maintain solids in suspension during microbial activity.

The oxygenation chamber utilized in connection with the present invention may be provided with an annular opening or orifice defined in the bottom wall thereof which opening is partially restricted by means of an adjustable outlet means which in turn is effective to establish a substantially horizontal, radial flow pattern of oxygenated wastewater emitted from the chamber. Adjustment of the outlet means which may include a nozzle element will alter the velocity of oxygenated wastewater discharged into the treatment tank. Alternatively, the adjustable outlet means may comprise adjustable nozzle elements provided in the lower portions of one or more, or all, side walls of the oxygenating chamber such that a multidirectional flow pattern of oxygenated wastewater is established throughout the contents of the larger treatment tank.

BRIEF DESCRIPTION OF THE DRAWINGS

The invention will be more clearly understood by reference to the following detailed description of an exemplary embodiment thereof in conjunction with the following drawings in which.

DESCRIPTION OF PREFERRED EMBODIMENTS

Figure 1:
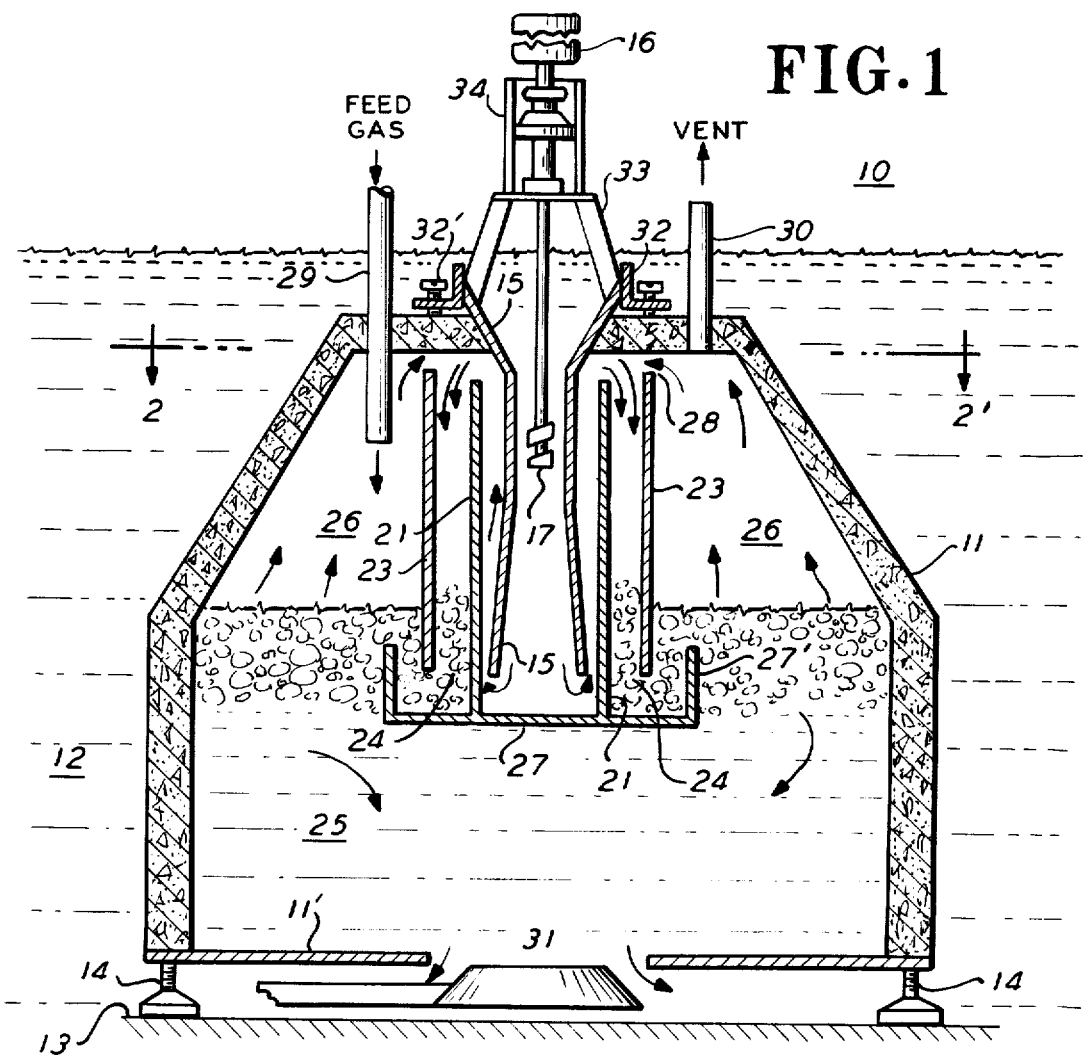
FIG. 1 is a sectional elevational view of an exemplary oxygenating apparatus in accordance with the present invention.

Referring to the drawing, and in particular to FIG. 1, illustrated therein is an exemplary embodiment of an apparatus for oxygenating wastewater which may be utilized in an activated sludge waste treatment process. Oxygenating apparatus 10 is preferably submerged in wastewater 12 which may comprise 'mixed liquor' contained in a secondary stage treatment tank having a bottom 13, includes a chamber 11 having an inlet 15, static mixing means in form of gravitational fall zones 24 and an adjustable outlet means 31. Chamber 11 is preferably comprised of a material such as concrete and may have a bottom wall 11' formed from a material such as mild steel although other suitable water impervious materials offering the necessary support will be acceptable. A plurality of legs 14, which may be adjustable in height, are provided to position chamber 11 such that bottom wall 11' is spaced away from the bottom 13 of a secondary stage treatment tank confining a body of wastewater 12. The inlet 15 to chamber 11 is comprised of a conduit which may generally take the form of a venturi that extends from the uppermost portions thereof above the top wall of chamber 11 downwardly therein. Preferably, a suitable baffle means 32, which may comprise an annular ring member, is disposed about the top of inlet 15 with the uppermost edge of baffle means 32 extending to a point slightly below the surface of wastewater 12. The vertical position of baffle means 32 may be varied by rotation of an adjustment screw 32' threadably engaged with a flange portion of baffle means 32. The purpose of adjusting the height of baffle means 32 is to compensate for variations in the level of wastewater. It will be appreciated that such height adjustments may be provided automatically in response to detected variations in the level of wastewater 12.

A motor 16 and a suitable shaft coupling 34 are mounted by means of support elements 33 atop chamber 11 with pump motor 16 being located above the surface of wastewater 12. A shaft having an impeller 17 mounted thereon extends downwardly from coupling 34 into inlet 15 and upon operation of motor 16, impeller 17 is rotated to axially pump wastewater from the upper portion of inlet 15 downwardly therethrough. By configuring conduit 15 such that the lower portion increases in cross-sectional area toward the lowermost extremity thereof, a diffusing effect is obtained whereby the hydraulic energy imparted to wastewater pumped therethrough is converted to a pressure head and the velocity of influent wastewater decreases upon flowing to the bottom or exit of inlet 15. The influent wastewater thus enters a space or re-entrant well immediately above partition 27 and is then forced upwardly exteriorally of inlet 15 between vertically extending partitions 21. The change in direction of the flow of influent wastewater in the space immediately above partition 27 will cause frictional losses to be incurred. However, as the velocity of the influent wastewater is reduced by the diffusing effect achieved in the lower portion of inlet 15, the frictional and hence head losses of the influent flow are correspondingly reduced. In addition, as will be described subsequently, a relatively low superficial flow velocity of wastewater through the static mixing means of chamber 11 of approximately 0.3–3.0 ft/sec. is desirable. However, as most readily available pump motors operate at relatively high speeds, e.g. 1,000 r.p.m. or higher, any reduction in the velocity of wastewater forced into the re-entrant well immediately above partition 27 facilitates the generation of superficial flow velocities in the foregoing range.

The static mixing means of chamber 11 is defined by partitions 21, baffles 23, each of which baffle is spaced away from a corresponding partition 21 and a substantially horizontal partition 27 having an upwardly extending portion 27' spaced away from vertically disposed baffle 23 as illustrated in FIG. 1. The aforementioned partitions and baffle define a pair of gravitational fall zones 24 although it will be appreciated that one or more than two fall zones may be defined in an oxygenation chamber in accordance with the present invention. Preferably, the arrangement of fall zones and the appropriate partitions and baffles therefor is symmetrical about a center line of chamber 11 as such symmetry is necessary to assure the proper balance of the chamber when emplaced in a body of wastewater. A feed gas is introduced through conduit 29 into the upper reaches of chamber 11 under a predetermined positive pressure. The feed gas, which is preferably an oxygen enriched gas of at least 40 percent oxygen is effective to depress the level of liquid within chamber 11 to a level corresponding to the magnitude of the pressure of the feed gas. Accordingly, in this manner a liquid accumulation space 25 is formed in the lower reaches of chamber 11 while a gas accumulation space 26 is formed in the chamber thereabove. A conduit 30 is provided to extend into the upper reaches of chamber 11 in order to vent the oxygenating gas formed within gas accumulation space 26. Although the particular reason for providing such a venting conduit will be described in greater detail hereafter it will be appreciated that gas accumulation space 26 should be symmetrical about a center line through chamber 11 as unequal buoyant forces produced by gas accumulation space 26 will unbalance chamber 11. Furthermore, to avoid unnecessary buoyant forces, the volume of gas accumulation space 26 is conveniently reduced by slanting the upper portions of the side walls of chamber 11. Appropriate relief valves may be provided to limit the pressure within gas space 26 to a level such that the 'water seal' provided by influent wastewater in inlet 15 is not disrupted.

An adjustable outlet means 31, which may comprise a nozzle having a variable opening is disposed in the lower portion of chamber 11 and, as illustrated in FIG. 1, may be formed in the bottom wall 11' thereof. The provision of such an adjustable outlet means is effective to permit the discharge of oxygenated wastewater from liquid accumulation space 25 of chamber 11 into the secondary treatment tank and by suitably adjusting the opening of such a nozzle, the velocity of discharged wastewater may be effectively controlled. As will be described in greater detail with reference to the structure illustrated in FIG. 3, adjustable outlet means 31 depicted in FIG. 1 is effective to discharge oxygenated wastewater from chamber 11 in a substantially horizontal, radial flow pattern throughout the lower reaches of wastewater 12, thereby providing a turbulence or mixing action at the levels of wastewater 12 where such mixing is most effective in maintaining substantially all solids in suspension, and thus assure satisfactory microbial digestion.

Figure 2:
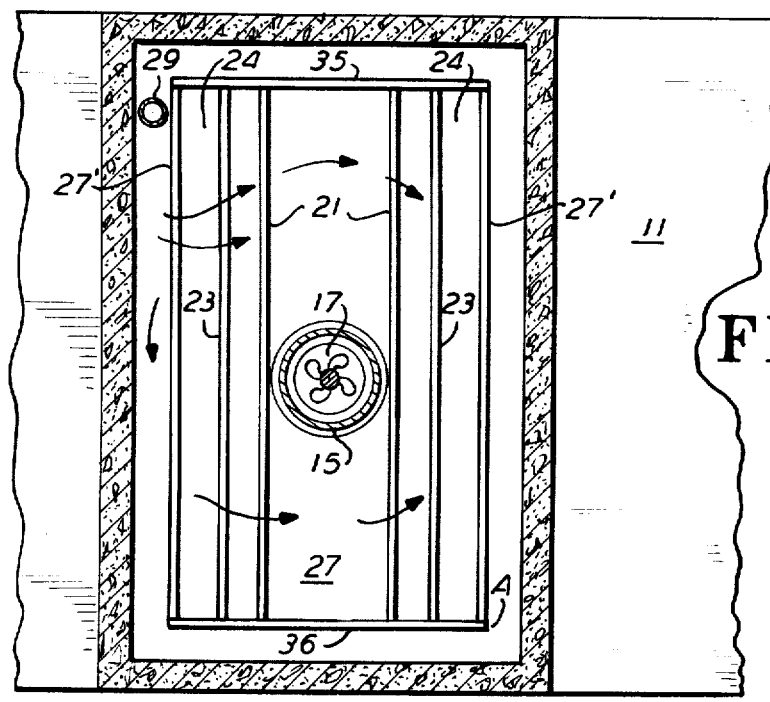
FIG. 2 is a partial sectional plan view taken along the line 2–2' illustrated in FIG. 1.

Referring now to FIG. 2, illustrated therein is a partial sectional view of the exemplary embodiment of apparatus for dissolving a gas in a liquid taken along the sectional line 2–2' depicted in FIG. 1. Inlet 15 and impeller shaft 17 are preferably centrally located within chamber 11 and baffles and partitions 21, 23 and 27 are configured to define a pair of static mixing devices in the form of gravitational fall zones 24 which extend laterally substantially completely along the length of chamber 11. In this manner, chamber 11 is efficiently utilized as the length of each fall zone, extending between side panels 35 and 36, is maximized within the chamber. The arrows depicted in FIG. 2 generally indicate the approximate flow of an oxygen enriched feed gas supplied to the interior of chamber 11 through conduit 29. It will be appreciated that the oxygen enriched feed gas introduced into chamber 11 is permitted to flow around inlet 15 and is thus available as a source of oxygen which is dissolved in wasterwater flowing through fall zones 24 to the right and left of inlet conduit 15. Preferably, venting conduit 30 illustrated in FIG. 1 is provided at a suitable location in the interior of chamber 11 remote from the location of feed gas conduit 29. Accordingly, by locating a venting conduit in proximity to corner A above the right hand extremity of panel 36, a substantial interaction between the wastewater to by oxygenated and the feed gas will occur prior to the venting of oxygenating gas which will typically include impurities such as nitrogen stripped from the wastewater. In this manner, a "short circuiting" of the oxygen enriched feed gas between feed conduit 29 and a vent 30 (FIG. 1) and hence, the inefficient use of such a feed gas, is substantially reduced.

Briefly, the operation of oxygenating apparatus 10 illustrated in an exemplary form in FIGS. 1 and 2 will now be described. Initially, pump motor 16 is energized and an oxygen-enriched feed gas is supplied through conduit 29 to the upper reaches of chamber 11 thereby causing the level of wastewater therein to be depressed to a predetermined extent as mentioned previously. Actuation of impeller 17 is effective to force wastewater into inlet 15 and by appropriately adjusting the height of baffle 32, a surface velocity of wastewater will be established thereby drawing any foam which may form on the surface into inlet 15. Any foam drawn into inlet 15 is finely dispersed by the action of impeller 17. As described heretofore, the introduced wastewater is then passed upwardly between the exterior of inlet 15 and partitions 21 so as to form a water seal between gas accumulation space 26 and inlet 15 thus preventing the escape of the oxygenation gas through inlet 15 even in the event of motor stoppage due to power failure.

Wastewater is forced over the uppermost extremity of partitions 21, through the oxygenating gas in fall zones 24 and impinges on the wastewater lying in the lower reaches of each fall zone. The resulting gas-liquid turbulence is effective to cause a mass transfer of oxygen supplied to the gas accumulation space 26 into wastewater flowing through each fall zone 24. Thus, as the velocity of wastewater forced to flow through fall zone 24 increases, the turbulence therein and hence the mass transfer rate of oxygen into the wastewater is increased. However, the increased flow rate of such wastewater requires a greater expenditure of energy, i.e., electrical power consumed by pump motor 16 driving impeller 17, and as the wastewater is retained in fall zone 24 for a relatively short period of time due to the high superficial flow velocity thereof (the wastewater flow rate divided by the cross-sectional area thereof between partitions 21), less time is available for effecting the aforementioned mass transfer and correspondingly, the benefits of increased wastewater-oxygenation gas turbulence in the fall zone are not fully realized. Similarly, by decreasing the superficial flow velocity of wastewater over the top of partitions 21 to a very low rate, the expenditure of energy necessary to effect such a flow rate is substantially reduced but as the wastewater-oxygenation gas turbulence within the fall zone 24 is likewise reduced, the mass transfer rate of oxygen into the wastewater flow is severely limited. Therefore, by selecting an appropriate fall height and suitable superficial flow velocities, e.g. between 0.3 and 3.0 ft/sec., a turbulent froth column is developed and confined within the fall zone 24 such that the resulting mass transfer rate of oxygen into the wastewater is maintained at an acceptably high level while also avoiding the consumption of excessive amounts of electrical energy by pump motor 16. It has been found that for any particular fall height, wastewater flowing through a fall zone at a superficial flow velocity of approximately 0.75–1.5 ft./sec. is preferred.

As the wastewater is exited from fall zones 24 and passes over the top portion of partition 27', a portion of the oxygenating gas supplied to the fall zones is entrained in the wastewater and is swept into liquid accumulation space 25. This space comprises a relatively quiescent portion of chamber 11 and as the velocity of wastewater admitted into space 25 decreases, bubbles of the oxygenating gas swept into this space are disentrained into gas accumulation space 26. By disposing baffles 23 such that a passage 28 is formed between the uppermost extremity of such baffles and the top wall of chamber 11 the oxygenating gas which has not been dissolved in wastewater in fall zone 24 is returned to the upper portion of such fall zones and is available for dissolution in the wastewater. It will be understood that by returning or recycling the oxygenating gas disentrained from wastewater in liquid accumulation space 25, substantial improvements in the utilization of a feed gas are obtained. Thus, although some oxygen is present in the oxygenating gas vented through conduit 30, recycling of the disentrained oxygenating gas causes the greater portion thereof (e.g. up to and above 90 percent) to be dissolved in the wastewater.

The oxygenated wastewater in liquid accumulation space 25 is discharged from chamber 11 through an adjustable outlet means 31 appropriately positioned at an aperture defined in bottom wall 11'. As will be described in greater detail hereafter, outlet means 31 is effective to emit oxygenated wastewater from chamber 11 in a substantially horizontal, radial pattern such that the emitted wastewater stream is thoroughly mixed with wastewater 12 in substantially all areas of the treatment tank. In addition, by emitting oxygenated wastewater which preferably exhibits a dissolved oxygen level of at least 15 p.p.m. in a 360° horizontal flow pattern and at predetermined velocity of, for example, 2.0–6.0 ft./sec. an adequate stirring of wastewater 12 is achieved such that solid particles are adequately maintained in suspension and a dissolved oxygen level of at least 2.0 p.p.m., which is sufficient to sustain aerobic conditions, is established throughout wastewater 12. By discharging oxygenated wastewater from the lower reaches of chamber 11 as illustrated in FIG. 1, the highest degree of "tank mixing" is obtained at the portion of the tank where such mixing is most urgently required, namely at the bottom or lower levels thereof. Thus, solid particles, including the organic waste material and activated sludge are maintained in suspension thereby enabling the successful aerobic digestion of such organic materials in wastewater 11.

Figure 3:
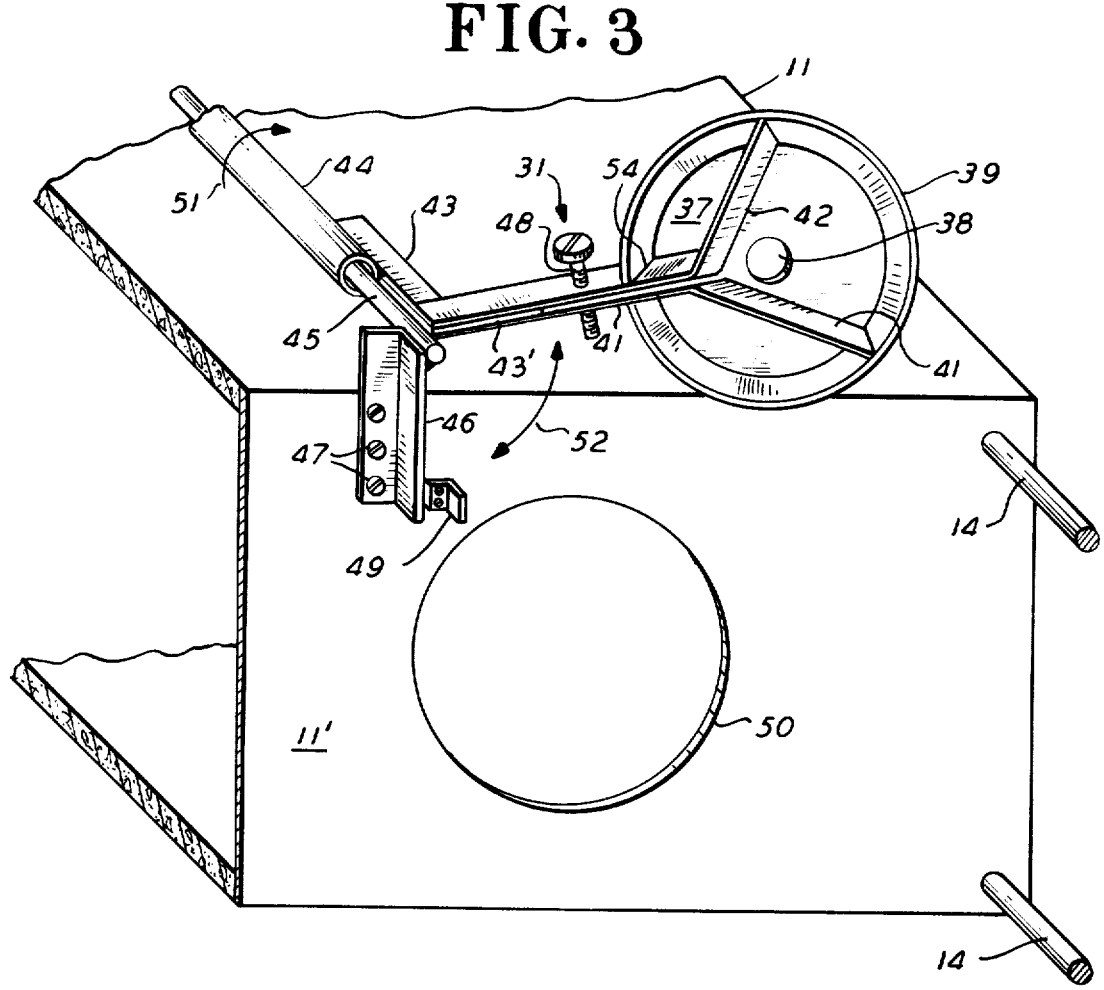
FIG. 3 is a partial isometric view primarily of the bottom wall of the oxygenating chamber together with an adjustable outlet nozzle device.

Referring now to FIG. 3, illustrated therein is an exemplary embodiment of adjustable outlet means 31 which is effective to establish a radial flow pattern of oxygenated wastewater discharged into wastewater 12 through an aperture 50 defined in bottom wall 11' of chamber 11. Although the illustrated apparatus is particularly effective for producng the aforementioned radial discharge of oxygenated wastewater from chamber 11, it will be appreciated that other flow patterns of oxygenated wastewater in wastewater 12 may be achieved by appropriately modifying the geometry of adjustable outlet means 31 and aperture 50. Adjustable outlet means 31 is, in essence, comprised of plate and rim cnfiguration 38, 39, support means 41-43 and 46, an adjustment means 44, 48 and 49. Plate member 37 preferably comprises the uppermost surface of adjustable outlet means 31 and is of a surface area corresponding to and smaller than aperture 50. A relatively small aperture 38 is defined in plate 37 to enable the flow of a portion of the discharged oxygenated wastewater therethrough for reasons which will become readily apparent hereinafter. Rim 39 is rigidly attached to the perimeter or circumference of plate 37 or, rim 39 may be integrally formed with plate 37. Preferably, rim 39 extends downwardly from plate 37 at an acute angle from the horizontal which plate and rim thereby form a nozzle element and define the angle at which oxygenated wastewater is discharged from chamber 11 with respect to the bottom of the treatment tank containing wastewater 12. However, in portions of the treatment tank remote from outlet means 31, the flow pattern of oxygenated wastewater will be substantially horizontal. Thus, by varying the angle at which rim 39 is disposed with respect to the horizontal plane in which plate 37 lies, the degree to which emitted oxygenated wastewater spreads throughout the treatment tank, as opposed to abruptly contacting the bottom of such tank may be varied. However, the angle of discharge cannot in practice be made too acute as the smaller the angle, the greater is the likelihood that discharged oxygenated wastewater will attach to bottom wall 11' in accordance with the well known Coanda effect. As wall attachment will inhibit the mixing of oxygenated wastewater and wastewater 12, the 'discharge angle' must not be reduced so as to generate a Coanda effect.

Plate 37 and rim 39 are preferably supported by, for example, a pair of support arms 41 and 42 which may extend through rim 39 and are rigidly affixed thereto, such as, for example, by means of a weld along line 54 as illustrated in FIG. 3. In addition, the ends of arms 41 and 42 remote from line 54 are also rigidly affixed, as for example, by welding, etc. to the interior surface of rim 39, thereby providing a rigid support for plate 37 and rim 39. A setscrew 48 is preferably threaded through arms 41 and 42 at a point exteriorally of rim 39. A stop flange or bracket 49 is appropriately affixed to the bottom wall 11' of chamber 11 such that upon rotation of arms 41 and 42 generally along the line indicated by arrow 52, setscrew 48 will engage stop bracket 49 and by the appropriate adjustment of setscrew 48, the nozzle element formed by plate 37 and rim 39 may be conveniently centered with respect to aperture 50 to thereby define a substantially annular passage through which oxygenated wastewater is emitted. A support member 43 which may comprise a right angle bracket having an extending portion 43' is fixedly attached, such as by welding to sleeve 44 and arms 41 and 42 are additionally fixedly attached to extending portion 43' of support member 43. Sleeve 44 may be comprised of a tubular member preferably having a circular cross section with at least the lower portion thereof being comprised of a substantially noncorrosive material such as stainless steel. Sleeve 44 is preferably fitted over a guide rod 45 which extends in a substantially vertical direction adjacent to the sidewall of chamber 11. The lower portion of rod 45 is preferably comprised of a material such as stainless steel in order to reduce wear due to the bearing action between sleeve 44 and rod 45. Thus, although a certain degree of wear is inevitable during the adjustment of nozzle 31, as will be described in greater detail hereafter, it is preferable to provide bearing surfaces of a material which will not readily corrode in an ambient essentially comprised of a liquid such as wastewater. The lower portion of rod 45 is preferably rigidly affixed to a bracket 46 which in turn is rigidly mounted on bottom wall 11' of chamber 11 such as by means of bolts 47.

In order to establish a predetermined flow pattern of oxygenated wastewater discharged from chamber 11, sleeve 44 which preferably extends to a point above the wastewater into which chamber 11 is to be inserted is rotated in a clockwise direction as generally indicated by arrow 52. As a consequence of such rotation, support member 43 and arms 41 and 42 and hence the nozzle element comprised of plate 37 and rim 39 are likewise rotated from a disengaged position (illustrated in FIG. 3) until the lower extremity of setscrew 48 comes into contact with stop bracket 49. By appropriately adjusting screw 48, plate 37 and rim 39 of adjustable outlet means 31 are centered or are positioned in any other predetermined location to establish a radial, or other flow pattern of discharged oxygenated wastewater, respectively. It will be appreciated that the aforementioned adjustment or centering of adjustable outlet means 31 may be accomplished prior to the insertion of chamber 11 into wastewater to be oxygenated. In addition, by providing an aperture 38 in plate 37, a fraction of the discharged oxygenated wastewater may be emitted directly beneath plate 37 and rim 39 thereby maintaining a stirring action of the liquid therebelow and thus preventing any accumulation of sludge or other solid materials in a "dead" space beneath plate 37. Such a stirring action is important when, for example, the clearance between the lower edge of rim 39 and the bottom of the treatment tank confining wastewater 12 (FIG. 1) is on the order of 6–12 inches. Accordingly, it is considered beneficial to divert a portion of the oxygenated wastewater to be discharged from chamber 11 into the aforedescribed space beneath plate 37 and rim 39 thereby avoiding formation of any "dead" spaces.

It will be appreciated that other means may be utilized for the purpose of centering plate 37 and rim 39 with respect to aperture 50. For example, a plurality of vanes may be disposed so as to extend from the surface of rim 39 (not shown) and, for example, by appropriately spacing such vanes on rim 39, a centering thereof with respect to aperture 50 together with the establishment of a plurality of streams of discharged oxygenated wastewater is achieved.

Figure 4:
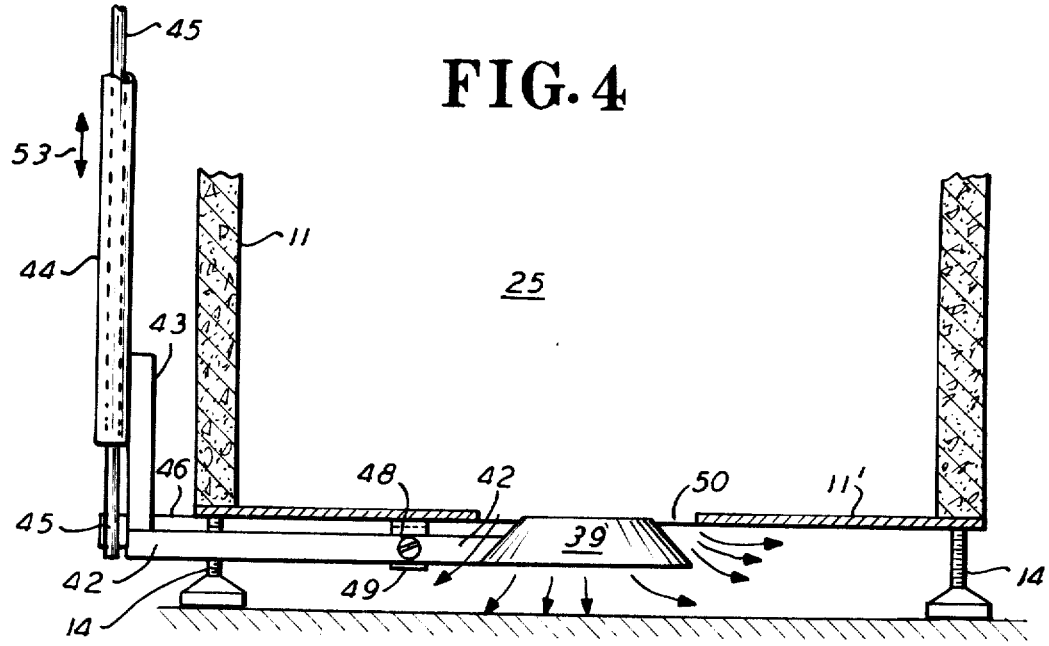
FIG. 4 is a partial elevational view of the oxygenating chamber and adjustable nozzle device depicted in FIG. 3.

Upon the centering, or otherwise positioning adjustable outlet means 31 with respect to aperture 50, the oxygenating chamber 11 may be inserted into wastewater 12 to be treated. The velocity of oxygenated wastewater discharged from liquid accumulation space 25 of chamber 11 may also be adjusted as will be seen by reference to FIG. 4. The translation of sleeve 44 in a substantially vertical direction as, for example, along the line indicated by arrow 53 (FIG. 4), will cause an adjustment in the vertical position of support member 43 and support arms 41 and 42 rigidly affixed thereto. Accordingly, raising sleeve 44 by any convenient mechanism (not shown) reduces the effective width of the annular exit passage formed at aperture 50 and through which oxygenated wastewater may be discharged into the larger treatment tank, thereby increasing the velocity of such discharged wastewater. In this manner, translation of sleeve 44 in a vertical direction may be utilized to control or regulate the velocity of oxygenated wastewater emanating from chamber 11. As influent wastewater is continually pumped through inlet 15 (FIG. 1) and a feed gas is supplied through conduit 29, it is necessary to avoid any plugging or clogging of the outlet of chamber 11 defined by aperture 50. By configuring arms 41 and 42 such that the height thereof is substantially less than the height of rim 39, complete closure of adjustable outlet means 31 is precluded. It will be seen that upon raising sleeve 44 the upper surface of, for example, arm 42 will abut the bottom wall 11' of chamber 11; however, such abutment will nonetheless retain at least a portion of aperture 50 in the form of an annular passage of reduced width in communication with the exterior of chamber 11 as rim 39 will be precluded from being translated into contact with bottom wall 11'. Thus, rim 39 will remain spaced away from the edge of bottom wall 11' defining the annular exit passage at aperture 50 and hence, plugging or clogging of such aperture will be inhibited.

It will also be appreciated that in the event that any maintenance is required with respect to adjustable outlet means 31 subsequent to the emplacement of chamber 11 in a treatment tank, sleeve 44 may be rotated to the position generally depicted in FIG. 3. Sleeve 44 may then be raised upwardly along the sidewall of chamber 11 and may be removed from guide rod 45 for any necessary maintenance or repair. Reinsertion of adjustable outlet means 31 may be conveniently effected by sliding sleeve 44 over guide rod 45 and lowering sleeve 44 into wastewater 12 to a point such that the adjustable nozzle 31 may then be rotated into a predetermined position beneath bottom wall 11' and centered with respect to aperture 50 as heretofore described.

The secondary treatment tanks normally comprising a portion of a municipal sewage waste treatment plant will many times vary in both capacity and geometry. Therefore, certain secondary treatment tanks for oxygenating wastewater 12 may require particular flow patterns therein in order to assure that a sufficient stirring and/or mixing of the tank contents is effected. Although utilization of an adjustable outlet means 31 with oxygenating apparatus 10 illustrated in FIG. 1 is well suited to many secondary treatment tank configurations, it may be required to establish somewhat different flow patterns in other types of treatment tanks. In certain applications, it may be desirable to discharge oxygenated wastewater at any of several velocities essentially simultaneously from the sides of an oxygenating apparatus 10 as opposed to relying upon a single bottom wall discharge (FIG. 1) for mixing and stirring operations in all secondary treatment tank configurations. Thus, the extra capital costs incurred in providing an adjustable outlet means to emit a stream of oxygenated wastewater through each sidewall of an oxygenating apparatus 10 may be justified in the event that such a plurality of adjustable nozzles obtains requisite flow patterns within wastewater 12 which may not be readily attainable by reliance upon a single bottom wall discharge such as adjustable outlet means 31 heretofore described.

Figure 5:
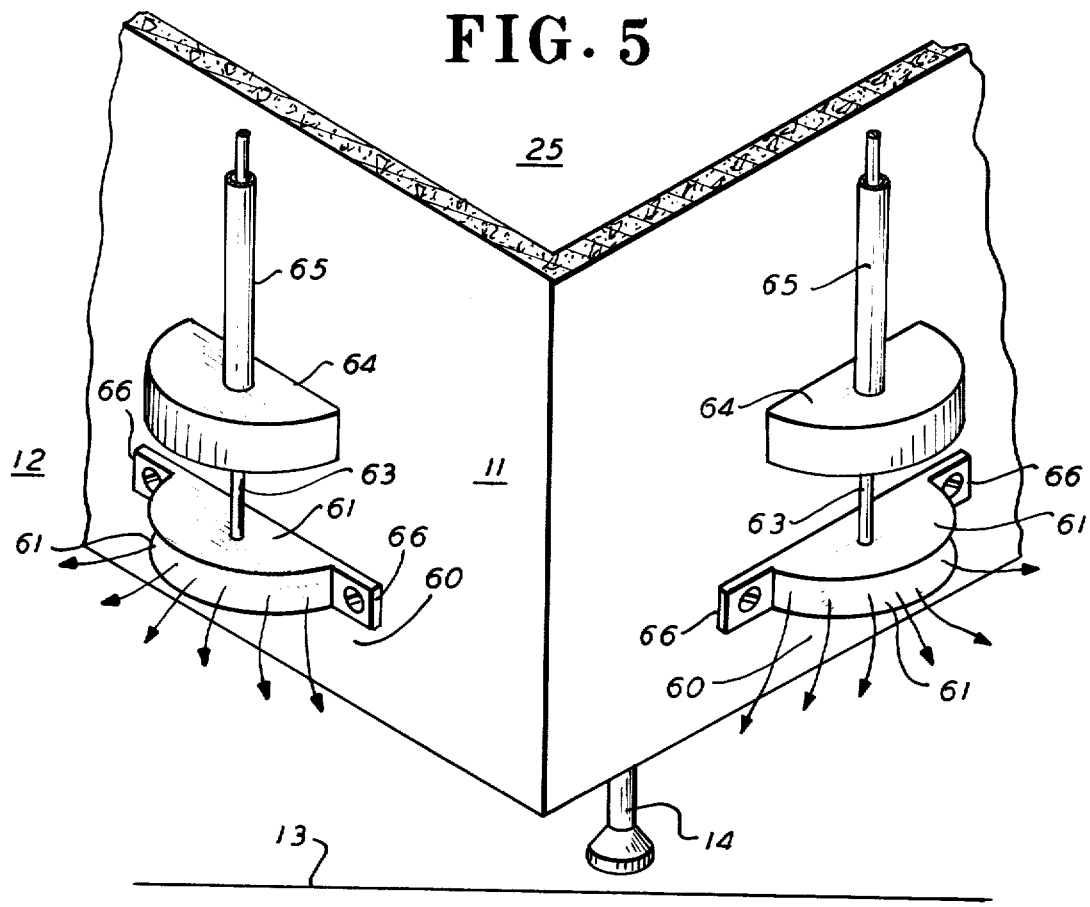
FIG. 5 is a partial isometric view of a plurality of outlet nozzles mounted in the side walls of an oxygenating chamber.

With reference to FIG. 5 illustrated therein is an exemplary embodiment of apparatus that may be utilized to effect a discharge of oxygenated wastewater from chamber 11 through one or more sidewalls thereof. An adjustable outlet means 60 includes top and bottom plate members 61 which are provided with a pair of retaining ears 66 and which members may be maintained spaced apart by suitable support brackets (not shown). A guide rod 63 extends upwardly in a substantially vertical direction from top member 61 and is adapted to receive a sleeve 65 having an internal diameter slightly larger than the diameter of rod 63. Rigidly affixed to the lower extremity of sleeve 65 is a cover 64 which includes top and side portions adapted to slidably engage top and bottom members 61. By inserting the upper extremity of guide rod 63, which preferably extends to a point above the surface of wastewater 12, through cover 64 and sleeve 65, the latter elements may be lowered along the sidewall of chamber 11 until cover 64 occludes at least a portion of the opening between members 61. By adjusting the vertical position of cover 64 as aforesaid, the height and hence the exposed area of the opening between members 61 will be correspondingly controlled. Thus, in the event it should be desired to increase the velocity of oxygenated wastewater discharged through adjustable outlet means 60, cover 64 may be lowered by lowering rod 65 to reduce the size of the opening between members 61 thereby causing the production of a stream of oxygenated wastewater at a greater velocity. In addition, by configuring top and bottom members 61 as illustrated in FIG. 5, for example, oxygenated wastewater is discharged into wastewater 12 in a multi-directional, fan-like manner through a range of approximately 10°–180° thereby facilitating a thorough mixture of oxygenated wastewater and wastewater 12 in a treatment tank. Alternatively, cover 64 may extend fully over the aperture between members 61 and may have an aperture defined in the vertical, side portion thereof in order to emit oxygenated wastewater at a particular velocity.

Figure 6:
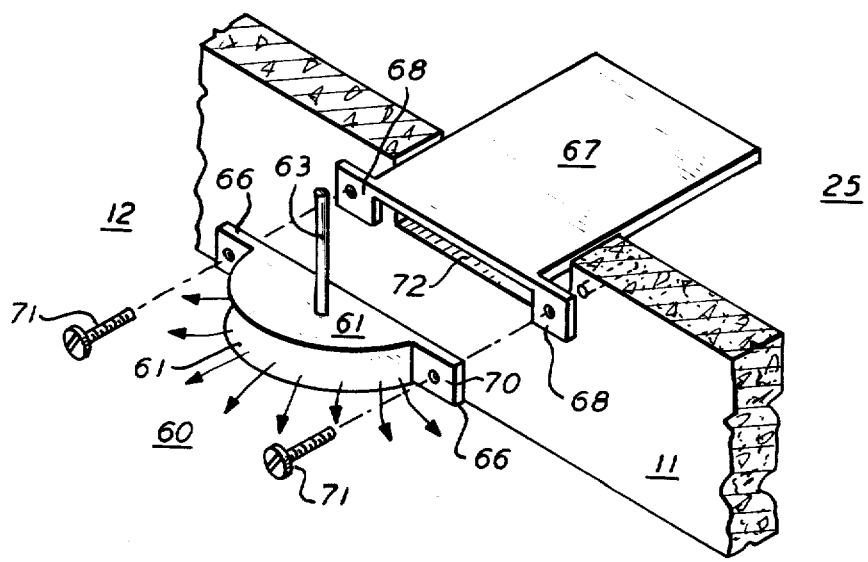
FIG. 6 is an isometric view of exemplary components which may be utilized to comprise one or more of the side wall mounted nozzles illustrated in FIG. 5.

Referring now to FIG. 6, there is illustrated in somewhat greater detail apparatus for discharging oxygenated wastewater from liquid accumulation space 25 of chamber 11 into wastewater 12. Each of retaining ears 66 of adjustable outlet means 60 is provided with threaded apertures therethrough and is adapted to receive a bolt 71. In addition, a baffle 67 is provided with substantially flat baffle surface and retaining ears 68 each of which ears is provided with a threaded aperture therein adapted to receive bolt 71. Suitable apertures are defined in sidewall 11 for receiving bolt 71 while an aperture 72, which may be of a rectangular cross-section is also formed in the sidewall of chamber 11. Accordingly, baffle 67 and adjustable nozzle 60 may be securely fastened to a sidewall of chamber 11 by means of bolts 71 and in cooperation with cover 64 (not shown), restricted passages of selected size are provided for effecting the discharge of oxygenated wastewater from liquid accumulation space 25 in a plurality of streams dispersing in a multi-directional, fan-like manner into wastewater 12 at any one of a range of flow velocities.

It will be recognized that with respect to the concept of discharging oxygenated wastewater through a sidewall of chamber 11, the fact that the discharge location is in closer proximity to the upper reaches of liquid accumulation zone 25 may cause a greater degree of entrained bubbles of the oxygenating gas to pass through adjustable outlet means 60 rather than being disentrained into gas accumulation space 26 (FIG. 1). It has been found, however, that by providing a substantially horizontally disposed baffle 67 as illustrated in FIG. 6, the generally downward flow of wastewater in liquid accumulation space 25 is diverted and entrained oxygenating gas bubbles within chamber 11 are substantially precluded from escaping therefrom by baffle 67, and thus the overall oxygen utilization of apparatus 10 is enhanced. However, it will be appreciated that other forms of baffle 67 than a horizontally disposed baffle member as illustrated in FIG. 6 may be appropriately disposed with relation to a sidewall discharge of chamber 11 and yet be within the scope of the present invention.

It will be appreciated that although the foregoing description is related to a single oxygenating apparatus 10, it is within the scope of the present invention to provide a plurality of such devices in a single secondary treatment tank. For example, by disposing a plurality of vanes on an adjustable outlet means such as means 31 illustrated in FIG. 1, various flow patterns may be established as a result of streams discharged from one oxygenating apparatus cooperating with streams discharged from another similar apparatus.

While the present invention has been particularly described in terms of specific embodiments thereof, it will be understood that numerous variations upon the invention are now enabled to those skilled in the art, which variations are yet within the scope of the instant teaching. Accordingly, the present invention is to be broadly construed and limited only by the scope and spirit of the claims now appended hereto.

What is claimed is:

1. Apparatus for oxygenating a body of wastewater containing organic solids comprising a generally enclosed oxygenating chamber having top, bottom and sidewalls and emplaceable in said body of wastewater and having an aperture defined in said bottom wall of said chamber; means for pumping wastewater under treatment into said chamber through an inlet thereof; means for creating a turbulent condition in said pumped wastewater in a mixing zone in said chamber and for contacting said turbulent wastewater with said oxygenating gas to thereby dissolve oxygen and entrain oxygenating gas in said turbulent wastewater; liquid accumulation means disposed within said chamber for receiving oxygenated wastewater from said mixing zone and for dissipating said turbulence to enable disentrainment and recovery within said chamber of undissolved oxygenating gas entrained in said wastewater in said mixing zone; and nozzle means for discharging said oxygenated wastewater into said body of wastewater at a velocity such that said body of wastewater is sufficiently stirred to maintain said organic solids suspended therein, the improvement comprising said nozzle means having a plate member and a rim portion extending at a downward angle from the periphery of the plate member which has an area smaller than the area of said aperture and a geometry corresponding to the geometry of said aperture; and means for supporting said plate member and rim portion spaced away from said bottom wall at said aperture such that oxygenated wastewater is discharged from said chamber in a predetermined, multi-directional pattern into said body of wastewater.

2. Apparatus as defined in claim 1 wherein said plate member and said aperture are substantially circular and the diameter of said plate member is less than the diameter of said aperture whereby a substantially annular passage is defined by said plate member and rim portion and said aperture.

3. Apparatus as defined in claim 2 wherein the position of said support means is vertically adjustable such that upon vertical translation of said support means, the width of said passage is varied and the velocity of discharged oxygenated wastewater is thereby controlled.

4. Apparatus as defined in claim 3 wherein said support means comprises a rotatable elongated member extending substantially vertically and exteriorally of said chamber, support arm means affixed to said plate member and rim portion and bracket means for rigidly securing said support arm means to the lower end of said elongated member.

5. Apparatus as defined in claim 4 additionally comprising a guide rod rigidly connected to said chamber and extending substantially vertically and exteriorally of said chamber, and wherein said elongated member comprises a substantially cylindrical tube disposed about said rod such that said plate member and rim portion may be positioned at said aperture upon rotation of said elongated member.

6. Apparatus as defined in claim 5 wherein the height of said support arm means between said rim portion and said bracket means is less than the height of said rim portion such that upon raising said elongated member with said plate member and rim portion positioned at said aperture, complete closure of said passage is inhibited by abutment of said support arm means against the bottom wall of said chamber.

7. Apparatus as defined in claim 1 wherein an aperture is defined in said plate member such that a minor portion of oxygenated wastewater discharged from said chamber flows through said plate member aperture thereby stirring wastewater below said plate member.

8. Apparatus as defined in claim 4 additionally comprising means for centering said plate member and rim portion at the aperture in the bottom wall of the chamber.

9. Apparatus as defined in claim 8 wherein said centering means comprise a set screw threadably engaged with said support arm means and a stop element mounted on the bottom wall of said chamber such that rotation of said set screw against said stop element is effective to center said plate member and rim portion relative to said aperture.

10. Apparatus as defined in claim 1 additionally comprising means disposed between said pumping means and said means for creating said turbulent condition for reducing the velocity of said pumped wastewater and thereby reducing frictional losses as said pumped wastewater flows to said means for creating said turbulent condition.

11. Apparatus as defined in claim 1 wherein said chamber inlet further includes adjustable baffle means disposed atop said chamber and means for adjusting the vertical position of said baffle means with respect to the surface of said wastewater being treated.

12. Apparatus for oxygenating a body of wastewater containing organic solids comprising a generally enclosed oxygenating chamber having top, bottom and sidewalls and emplaceable in said body of wastewater; means for pumping wastewater under treatment into said chamber; means for creating a turbulent condition in said pumped wastewater in a mixing zone in said chamber and for contacting said turbulent wastewater with said oxygenating gas to thereby dissolve oxygen and entrain oxygenating gas in said turbulent wastewater; liquid accumulation means disposed within said chamber for receiving oxygenated wastewater from said mixing zone and for dissipating said turbulence to enable disentrainment and recovery within said chamber of undissolved oxygenating gas entrained in said wastewater in said mixing zone; and nozzle means for discharging said oxygenated wastewater into said body of wastewater at a velocity such that said body of wastewater is sufficiently stirred to maintain said organic solids suspended therein, the improvement comprising said nozzle means including an aperture defined in the lower portion of at least one of said sidewalls; top and bottom plate members spaced apart from one another and disposed above and below said aperture, respectively, and extending from said sidewall into said body of wastewater; and adjustable cover means adapted to slidably engage said top plate member and extend downwardly therefrom such that the passage between said top and bottom plate members, through which passage said discharged oxygenated wastewater may flow, is controlled in dependence upon the vertical position of said adjustable cover means.

13. Apparatus as defined in claim 10 additionally comprising baffle means disposed interiorly of said chamber and extending substantialy horizontally from said sidewall above said aperture such that the discharge of bubbles of said oxygenating gas entrained in said oxygenated wastewater from said chamber is substantially inhibited.

* * * * *